(12) United States Patent
Dicke

(10) Patent No.: US 7,334,976 B2
(45) Date of Patent: Feb. 26, 2008

(54) COUNTERSUNK SCREW

(75) Inventor: Robert Dicke, Ennepetal (DE)

(73) Assignee: A_Z Ausrustung und Zubehor GmbH & Co. KG, Hattingen (DE)

( * ) Notice: Subject to any disclaimer, the term of this patent is extended or adjusted under 35 U.S.C. 154(b) by 0 days.

(21) Appl. No.: 10/933,710

(22) Filed: Sep. 3, 2004

(65) Prior Publication Data

US 2005/0063796 A1    Mar. 24, 2005

(30) Foreign Application Priority Data

Sep. 5, 2003   (DE) ........................... 203 13 819 U

(51) Int. Cl.
*F16B 23/00* (2006.01)
(52) U.S. Cl. ..................... 411/399; 411/188
(58) Field of Classification Search ............... 411/399, 411/187, 188, 378
See application file for complete search history.

(56) References Cited

U.S. PATENT DOCUMENTS

| | | | | |
|---|---|---|---|---|
| 378,857 | A * | 2/1888 | Woodford | 411/396 |
| 586,232 | A * | 7/1897 | English | 411/399 |
| 877,131 | A * | 1/1908 | Searelle | 411/399 |
| 1,084,643 | A * | 1/1914 | Lasater | 411/399 |
| 1,151,861 | A * | 8/1915 | Brumback | 411/399 |
| 1,175,665 | A * | 3/1916 | Sweet | 411/403 |
| 3,124,031 | A * | 3/1964 | Knohl | 411/418 |
| 3,710,676 | A | 1/1973 | Ringland | |
| 3,903,784 | A * | 9/1975 | Dekker | 411/399 |
| 4,016,795 | A | 4/1977 | Gill | |
| 4,064,784 | A | 12/1977 | Adler | |
| 4,655,661 | A * | 4/1987 | Brandt | 411/387.1 |
| 4,708,557 | A | 11/1987 | Hashimoto | |
| 4,836,730 | A | 6/1989 | Jesson et al. | |
| 5,039,262 | A * | 8/1991 | Giannuzzi | 411/30 |
| 5,199,839 | A * | 4/1993 | DeHaitre | 411/387.3 |
| 5,203,657 | A * | 4/1993 | Nagoshi et al. | 411/399 |
| 5,205,694 | A * | 4/1993 | Nagoshi et al. | 411/399 |
| 5,234,299 | A * | 8/1993 | Giannuzzi | 411/31 |
| 5,249,882 | A * | 10/1993 | Nagoshi et al. | 411/399 |

(Continued)

FOREIGN PATENT DOCUMENTS

DE    84 09 108.8    7/1984

(Continued)

*Primary Examiner*—William L. Miller
(74) *Attorney, Agent, or Firm*—Brinks Hofer Gilson & Lione

(57) ABSTRACT

The invention relates to a countersunk screw having a threaded shank and a countersunk head, which latter has a conical surface tapering at a countersinking angle in the direction of the threaded shank. The conical surface has a plurality of ribbed protrusions distributed over the periphery and jointly defining a conical enveloping surface with a cone angle. The countersinking angle of the conical surface is less than the cone angle of the ribbed protrusions. The ribbed protrusions have outer bearing surfaces, which define the conical enveloping surface and which, in terms of their areal size, are dimensioned in dependence on a material-specific surface pressure such that, in a screw application for fastening fittings or the like by screwing into a sinkhole between the ribbed protrusions and the respective sinkhole, a certain, surface-damage-preventing surface pressure is generated. The ribbed protrusions are additionally designed such that, in a screw application involving direct, countersinking screwing into a soft material, such as, in particular, wood, they have a milling effect.

15 Claims, 2 Drawing Sheets

U.S. PATENT DOCUMENTS

| | | | |
|---|---|---|---|
| 5,275,601 A * | 1/1994 | Gogolewski et al. | 606/72 |
| 5,482,418 A * | 1/1996 | Giannuzzi | 411/29 |
| 5,487,633 A | 1/1996 | Roberts | |
| 5,516,248 A * | 5/1996 | DeHaitre | 411/387.2 |
| 5,518,352 A * | 5/1996 | Lieggi | 411/399 |
| 5,531,554 A * | 7/1996 | Jeanson et al. | 411/399 |
| 5,570,983 A * | 11/1996 | Hollander | 411/386 |
| 5,683,217 A * | 11/1997 | Walther et al. | 411/399 |
| 5,772,376 A * | 6/1998 | Konig | 411/399 |
| 5,895,187 A * | 4/1999 | Kuo-Tai | 411/386 |
| 6,042,314 A * | 3/2000 | Guelck | 411/399 |
| 6,048,150 A * | 4/2000 | Clarke | 411/187 |
| 6,164,887 A | 12/2000 | Palm | |
| 6,290,444 B1 * | 9/2001 | Dicke | 411/399 |
| 6,302,631 B1 * | 10/2001 | Takasaki et al. | 411/399 |
| 6,334,748 B1 * | 1/2002 | Gudjonsson | 411/399 |
| 6,394,725 B1 * | 5/2002 | Dicke | 411/399 |
| 6,402,757 B1 * | 6/2002 | Moore et al. | 606/80 |
| D462,895 S * | 9/2002 | Gaudron | D8/385 |
| 6,477,923 B2 * | 11/2002 | Amis | 81/121.1 |
| 6,558,097 B2 * | 5/2003 | Mallet et al. | 411/399 |
| 6,676,353 B1 * | 1/2004 | Haytayan | 411/442 |
| 6,698,987 B1 * | 3/2004 | Dicke | 411/387.6 |
| 2001/0038781 A1 * | 11/2001 | Mallet et al. | 411/399 |
| 2005/0063796 A1 * | 3/2005 | Dicke | 411/399 |

FOREIGN PATENT DOCUMENTS

| | | |
|---|---|---|
| DE | 3335092 A1 | 4/1985 |
| DE | 89 01 963.6 | 12/1989 |
| EP | 0 394 719 B1 | 9/1992 |
| EP | 0 516 431 A1 | 12/1992 |
| EP | 0 781 382 B1 | 7/1997 |

* cited by examiner

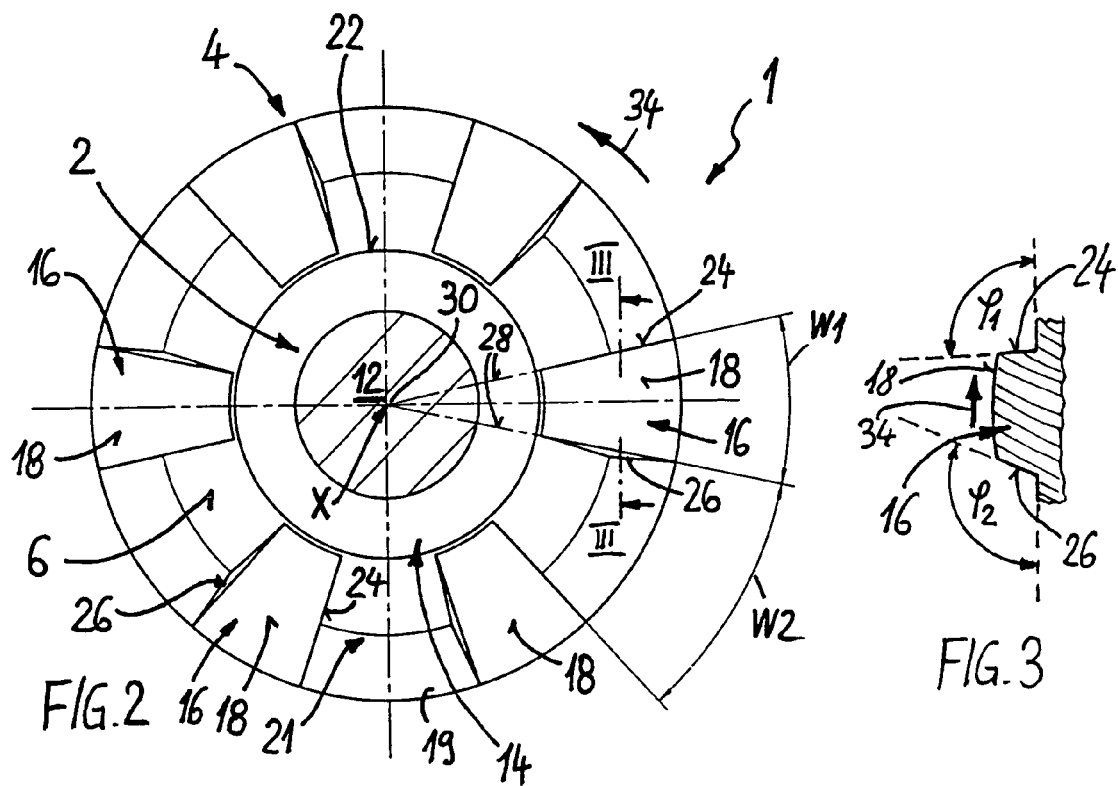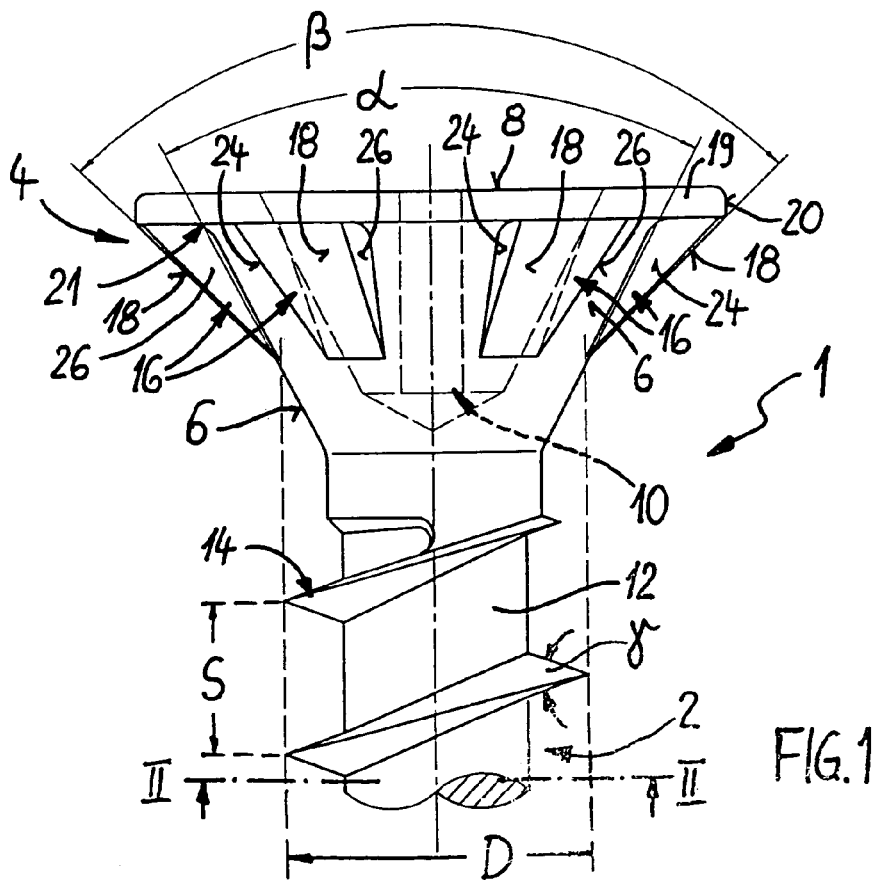

COUNTERSUNK SCREW

CROSS-REFERENCE TO RELATED APPLICATION

This application claims priority to German Utility Model Application filed Sep. 5, 2003.

BACKGROUND OF THE INVENTION

The present invention relates to a countersunk screw having a threaded shank and a countersunk head, which latter has a conical surface tapering at a countersinking angle in the direction of the threaded shank. The conical surface has a plurality of ribbed protrusions distributed over the periphery and jointly defining a conical enveloping surface with a cone angle, the countersinking angle of the conical surface being less than the cone angle of the ribbed protrusions.

SUMMARY OF THE INVENTION

Countersunk screws are known in numerous forms. The countersunk head can be configured as a flat or raised countersunk head. Such screws are used, on the one hand, to fasten fittings or like components, especially metal, the respective component having for each screw a countersunk mounting hole. The countersinking angle typically measures around 90°. On the other hand, such countersunk screws are also employed in large numbers for so-called wood-wood joints, since they are screwed in directly with no predrilling. The countersunk head is meant, in this case, to press and sink automatically into the respective material. In the latter application, however, because of the 90° countersinking angle, the wood in wood-wood joints is spliced. This is prevented by screws having a correspondingly smaller (steeper) countersinking angle. These screws are not, however, suitable for fastening components with 90° sinkholes, since they do not come to bear with a sufficiently large area in the sinkhole, which is also detrimental to the fastening of the component.

Such a countersunk screw of the generic type last described is described in EP 0 781 382 B1. The very narrow ribs which are provided on the conical surface formed with a relatively steep countersinking angle, have countersinking cutters so that the screw is capable, by means of the ribs, of free-cutting in a workpiece a countersink for the countersunk head. This screw is not therefore suitable for fastening fittings or the like with 90° sinkholes since the ribs would in this case cause surface damage with their countersinking cutters and would make an impression with their very narrow surfaces.

The object of the present invention is to create a countersunk screw of the stated type, which may virtually be used as a "universal screw", suitable for both of the described applications with good usage characteristics.

According to the invention, the above advantage is achieved by virtue of the described features. Further advantageous design features of the invention are contained in the subclaims.

A screw according to this invention has a conical surface has at least three rib-like ribbed protrusions distributed over the periphery, i.e. spaced apart in the peripheral direction, and having outer bearing surfaces which jointly define a conical enveloping surface and a cone angle. According to the invention, the ribbed protrusions are dimensioned to be relatively large. This means that, according to the invention, the area ratio of the sum of the bearing surfaces of all the ribbed protrusions to the sum of the respectively intervening regions of the conical surface is designed such that, on the one hand, the ribbed protrusions do not deter the countersunk head from sinking directly into wood or similar soft material and, on the other hand, in the fastening of components with sinkholes, a certain surface pressure is achieved between the ribbed protrusions and the respective sinkhole. The surface pressure is produced in such a way specific to the material or in dependence on the screw/component material combination (especially metal-metal) that surface damage in the region of the sinkhole of the component is avoided. When the screw is tightened, a high retaining force can in this case be conducted via the bearing surfaces into the respective component, with no risk of damage. At the same time, the ribbed protrusions are designed in such a way that, in the first-named application involving direct, countersinking screwing into a relatively soft material, such as, in particular, wood or a similar soft material, they have a milling effect (scraping effect). This helps to produce good countersinking of the head with minimal risk of splicing and provides low screw-in torque. Owing to the inventive arrangement of the bearing surfaces of the ribbed protrusions, this milling effect is absent, or only marginally present, in the fastening of fittings.

The countersinking angle of the conical surface is less than the cone angle of the enveloping surface of the ribbed protrusions. In a preferred design, the countersinking angle is of relatively small or steep configuration. It lies approximately within the range from 50° to 60° and, more particularly, measures around 53° to 55°. This countersinking angle is especially advantageous for direct screwing into wood with reduced risk of splicing in connection with the countersinking. By contrast, the cone angle of the ribbed protrusions measures around 90°, which is beneficial to the fastening of fittings and similar components with countersunk mounting holes having a countersinking angle of, likewise, around 90°.

The invention shall be described in greater detail with reference to preferred illustrative embodiments illustrated in the drawing, in which:

BRIEF DESCRIPTION OF THE DRAWINGS

FIG. 1 shows a partial side view of a countersunk screw according to the invention in the region of the countersunk head and of a part of the adjoining threaded shank, FIG. 2 shows a sectional view in the arrow direction II-II according to FIG. 1, FIG. 3 shows a partial section through the region of one of the ribbed protrusions according to the invention, in the plane III-III according to FIG. 2.

DETAILED DESCRIPTION OF THE INVENTION

Figure 4:
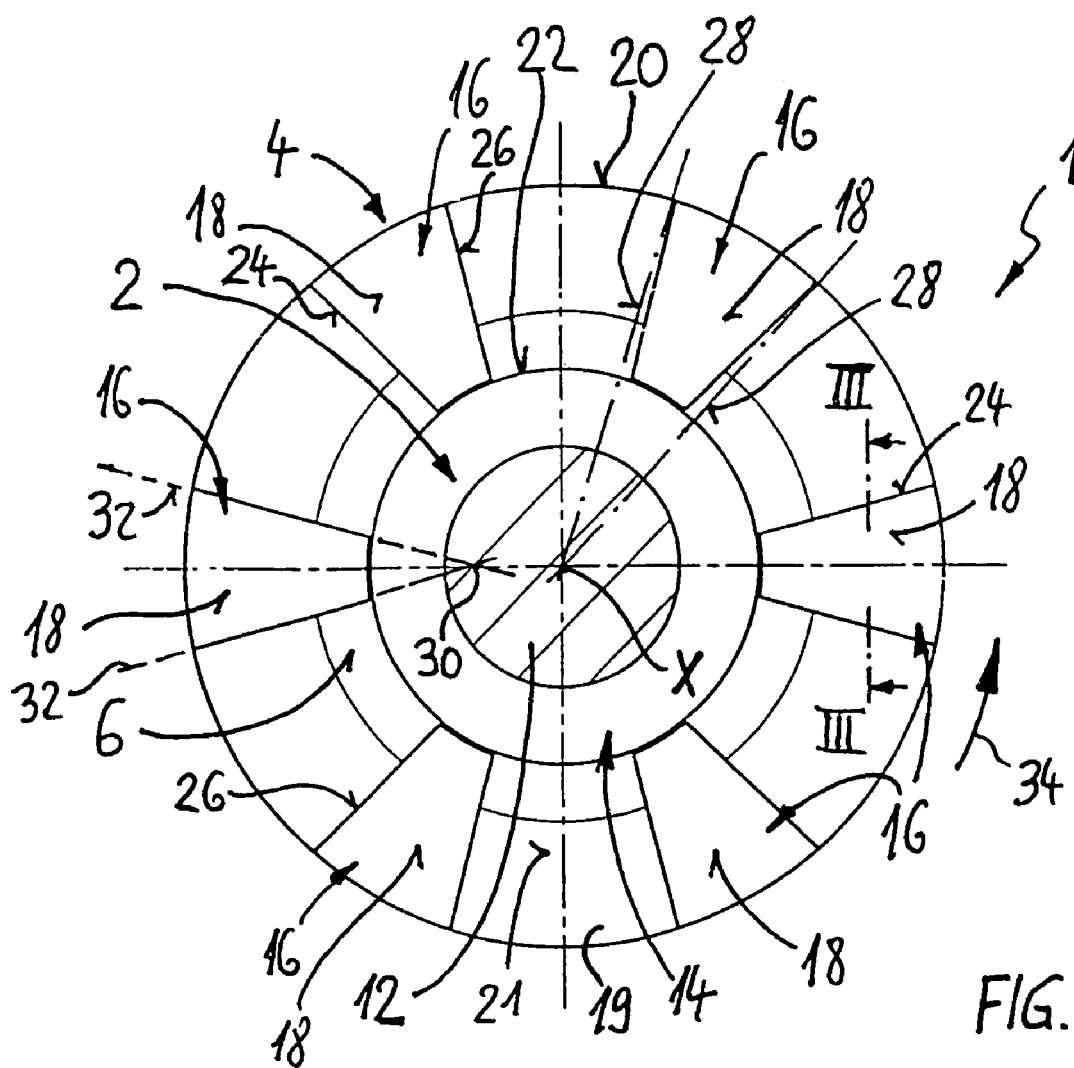
FIG. 4 shows a representation analogous to FIG. 2 in one construction variant.

A countersunk screw 1 according to the invention has a threaded shank 2 with a countersunk head 4. At the other end, the threaded shank 2 passes into a screw tip (not represented). The countersunk head 4 has a conical surface 6 tapering at a certain countersinking angle α in the direction of the threaded shank 2.

In the represented illustrative embodiment, the countersunk head 4 is constituted by a flat countersunk head, which, on its side opposite to the threaded shank 2, has a plane surface 8. Alternatively, the countersunk head 4 can also, however, be realized as a so-called raised head with a convexly curved surface. In both cases, the countersunk head 4 can preferably have a force application socket 10. Indicated in dashed representation in FIG. 1, this is especially in the form of a cross recess or a star-shaped insert, preferably with key guide.

The threaded shank 2 comprises an at least segmentally cylindrical core 12 and a single-start or multiple-start thread 14 running as an elevation helically across the core 12. The thread 14 defines with its outer thread edge a thread nominal diameter D. The thread pitch is marked with S in FIG. 1.

According to the invention, the conical surface 6 contains at least three ribbed protrusions 16 distributed over the periphery and spaced apart from one another. These ribbed protrusions 16 have outer bearing surfaces 18, which jointly define a conical enveloping surface with a cone angle $\beta$ (FIG. 1). The bearing surface 18 of each cone protrusion 16 thus forms a part of a cone surface with the cone angle $\beta$. According to the invention, it is herein envisaged that the countersinking angle $\alpha$ of the conical surface 6 is less than the cone angle $\beta$ of the enveloping surface of the ribbed protrusions 16. For a universal or selective use of the countersunk screw 1 in the applications described above, it is advantageous if the countersinking angle $\alpha$ is relatively steep and lies approximately within the range from 50° to 60°. For direct screwing into wood with countersinking of the countersunk head 4 with no or at least reduced risk of splicing, a countersinking angle $\alpha$ value of 53° to 55° is especially advantageous. The cone angle $\beta$ measures 90° and thus corresponds to the normal or standard countersinking angle of countersunk mounting holes of fittings or like components.

In addition thereto, on the one hand, the total area (sum) of all the bearing surfaces 18 of the ribbed protrusions 16 should not be too large, so that when countersinking in soft material, the ribbed protrusions 16 can readily be jointly sunk in. According to the invention, the ribbed protrusions 16 are herein designed such that, in this application of the screw involving direct countersinking screwing into, in particular wood or similar soft materials, they have a milling effect (scraping effect). This significantly reduces the risk of splicing. On the other hand, the ribbed protrusions 16, in terms of the area size of the bearing surfaces 18, are dimensioned in dependence on a material-specific surface pressure such that, in the application for the fastening of fittings or the like by screwing into a sinkhole between the ribbed protrusions 16 and the respective sinkhole, a surface pressure of such magnitude is generated that damage in the region of the sinkhole is avoided. In addition thereto, the sum of the bearing surfaces 18 of all the ribbed protrusions 16 should lie within the range from at least 40% to maximally around 60% of the conical enveloping surface related to the whole of the periphery. The minimum size of the bearing surfaces 18 of the ribbed protrusions 16, amounting to around 40% of the total area, is represented in FIG. 2. In addition thereto, the peripheral angular extent of the ribbed protrusions 16 is marked with W1, whilst the angular extent of the intervening regions is marked with W2. In the represented example, the angle W1 measures around 24° and the angle W2 around 36°. W1 thus corresponds to around 40% of the total angle of 60°. Preferably, however, the total size of all the bearing surfaces 18 should amount to around 50% of the total enveloping surface. This means that the sum of the bearing surfaces 18 of all the ribbed protrusions 16 is then approximately equal to the sum of the areas lying between the ribbed protrusions 16.

For most applications, including for the fastening of metal fittings (made of steel, aluminum or other non-ferrous metals), the screw 1 consists universally of a steel standardly used for screws.

The countersunk head 4, starting from the conical surface 6 on its side lying opposite the threaded shank 2, has a prominent peripheral rim 19 having an outer periphery 20 which is greater in diameter than the conical surface 6 (FIG. 1). On the bottom side between the peripheral rim 19 and the conical surface 6, a passage 21 is thereby formed. This passage 21 is virtually "filled" in the region of the ribbed protrusions so that the ribbed protrusions 16 with the bearing surfaces 18, according to FIG. 1 extend from the outer periphery 20 to the conical surface 6 according to the angle $\beta$. According to FIG. 2, the ribbed protrusions 16, starting from the outer periphery 20 of the countersunk head 4, extend essentially in the radial direction, at least up to the region of an axial projection of the outer threaded edge of the thread 14 of the threaded shank 2. In the represented example, the ribbed protrusions 16 end approximately at a circular line 22 (FIGS. 2 and 4) defined by the axial threaded projection and thus corresponding to the thread nominal diameter D. They could also run further inward in the direction of the cylindrical core 12, i.e. into the enveloping region of the thread.

Further, in the represented illustrative embodiments, six ribbed protrusions 16 of similar design and in even, radially symmetric peripheral distribution are provided. The number of ribbed protrusions 16 can also, however, lie within the range from three to, for example, eight. According to FIGS. 2 and 4, each ribbed protrusion 16, in terms of the shape of its bearing surface 18, is in this case configured essentially as a circular ring cutout (sector) with approximately radially running flanks 24, 26 (compare also FIG. 3). In the illustrative embodiment represented in FIG. 4, the flanks 24, 26 run, however, slightly "overradially", i.e. diverging from in to out more and in greater magnitude than with precisely radial flanks, such that each ribbed protrusion 16, in comparison with an embodiment having precisely radially running flanks (as represented in FIG. 2 and indicated by means of dash-dot lines 28 in FIG. 4), is formed narrower at the inner periphery (and wider at the outer periphery). In contrast to FIG. 2, according to FIG. 4 a point of intersection 30 of two limit lines 32 (marked in dashed representation) defined by the flanks 24, 26 hence lies not in the axial midpoint X of the screw (as is the case in FIG. 2), but radially between the latter and the respective ribbed protrusion 16.

As can further be seen from FIG. 3, the flanks 24, 26 limiting the respective ribbed protrusion 16 in the peripheral direction, form with the surface (conical surface 6) respectively, adjoining the foot of the ribbed protrusion 16 with a flank angle $\phi$ greater than/equal to 90°. It is herein preferably envisaged that the flank 24 which, during rotation, points forward in a screw-in direction (arrow 34) and has a steeper flank angle $\phi_1$, lying between 90° and maximally 95°, whilst the other flank 26 preferably has a flatter flank angle $\phi_2$ of greater than/equal to 95°. By virtue of the steeper flank angle $\phi_1$, the front flank 24 advantageously forms a type of milling edge which, in the countersinking, improves the milling effect. The flatter flank angle $\phi_2$ of the other flank 26 allows easier unscrewing of the countersunk screw 1.

In a further advantageous embodiment of the countersunk screw 1, the thread 14, according to FIG. 1, has a flank angle $\gamma$ in the region of around 35°. The pitch S of the thread 14 is dependent on the thread nominal diameter D and measures, in particular, around 60% of the nominal diameter D.

The invention is not limited to the illustrative embodiments which have been represented and described, but also covers all similarly-acting embodiments within the meaning of the invention. Moreover, the invention is also not yet limited to the combination of features specifically defined in the claims, but can also be defined by any chosen other combination of specific features of all the individual features disclosed overall. This means that, in principle, virtually any individual feature of an illustrated embodiment may be omitted or replaced by at least one individual feature disclosed elsewhere in the application. To this extent, claim 1 should only be regarded as an initial formulation attempt for an invention.

The invention claimed is:

1. A countersunk screw for fastening a metal part having a preformed sinkhole or for fastening a part formed of a soft material, including wood, not having a preformed sinkhole, the screw comprising:
    a threaded shank and a countersunk head,
    the countersunk head having a conical surface tapering at a countersinking angle in the direction of the threaded shank,
    the countersunk head having a plurality of ribbed protrusions protruding from the conical surface, the ribbed protrusions include outer bearing surfaces, the ribbed protrusions having flanks defining limit lines, the limit lines generally converging in the direction of the threaded shank,
    wherein the outer bearing surfaces jointly define a conical enveloping surface with a cone angle, the conical enveloping surface and the conical surface jointly define a total cone surface area,
    the countersinking angle of the conical surface being less than the cone angle of the conical enveloping surface,
    wherein the surface area of the conical enveloping surface lies within the range of at least 40% to about 60% of the total cone surface area,
    wherein the ribbed protrusions have an inner periphery and an outer periphery, the inner periphery being closer to the threaded shank than the outer periphery, the inner periphery being more narrow than the outer periphery,
    wherein when the screw is used for fastening the metal part having a preformed sinkhole the ribbed protrusions do not exert sufficient surface pressure to damage a contact surface of the sinkhole, and
    wherein when the screw is used for fastening the part formed of the soft material not having a preformed sinkhole the ribbed protrusions have a milling effect on the soft material to form a sinkhole.

2. The countersunk screw as claimed in claim 1, wherein the sum of the areas of the bearing surfaces of all the ribbed protrusions is approximately equal to the sum of the areas lying between the ribbed protrusions.

3. The countersunk screw as claimed in claim 1, wherein the countersinking angle lies approximately within the range from 50° to 60°.

4. The countersunk screw as claimed in claim 3, wherein the countersinking angle lies within the range from 53° to 55°.

5. The countersunk screw as claimed in claim 1, wherein the cone angle measures around 90°.

6. The countersunk screw as claimed in claim 1, wherein the ribbed protrusions, starting from an outer periphery of the countersunk head, extend essentially in the radial direction, at least up to the region of an axial projection of a thread of the threaded shank.

7. The countersunk screw as claimed in claim 1, wherein the ribbed protrusions are provided in similar design and in a number from three to eight in an even, radially symmetric peripheral distribution.

8. The countersunk screw as claimed in claim 7, wherein six of the ribbed protrusions are provided.

9. The countersunk screw as claimed in claim 1, wherein each ribbed protrusion, in terms of its bearing surface, is configured essentially as a circular ring cutout with the flanks running approximately radially.

10. The countersunk screw as claimed in claim 1, wherein each ribbed protrusion is limited in the peripheral direction by two of the flanks, the flanks forming with the respectively adjoining surface of the conical surface a flank angle greater than/equal to 90°.

11. The countersunk screw as claimed in claim 10, wherein a first of the flanks which, during rotation, points forward in a screw-in direction has a flank angle lying between 90° and 95°, whereas a second of the flanks preferably has a flank angle of greater than/equal to 95°.

12. The countersunk screw as claimed in claim 1, wherein the threaded shank comprises an at least segmentally cylindrical core and a thread running as an elevation across the core.

13. The countersunk screw as claimed in claim 12, wherein the thread has a flank angle of around 35°.

14. The countersunk screw as claimed in claim 12, wherein the thread has a pitch which is dependent on a thread nominal diameter and measures about 60° of the nominal diameter.

15. The countersunk screw as claimed in claim 1, wherein the countersunk head has a force application socket for a turning tool.

* * * * *

UNITED STATES PATENT AND TRADEMARK OFFICE
CERTIFICATE OF CORRECTION

PATENT NO. : 7,334,976 B2 Page 1 of 1
APPLICATION NO. : 10/933710
DATED : February 26, 2008
INVENTOR(S) : Robert Dicke It is certified that error appears in the above-identified patent and that said Letters Patent is hereby corrected as shown below:

On the Title Page

In column 1, item (73), Assignee before "Ausrustung" delete "A_Z" and substitute --A-Z-- in its place.

Signed and Sealed this

Twenty-third Day of September, 2008

JON W. DUDAS
*Director of the United States Patent and Trademark Office*